United States Patent [19]

Olasz et al.

[11] Patent Number: 4,574,625
[45] Date of Patent: Mar. 11, 1986

[54] SURFACE FINISH, DISPLACEMENT AND CONTOUR SCANNER

[75] Inventors: Joseph S. Olasz, North Kingston; William C. MacIndoe, West Warwick, both of R.I.

[73] Assignee: Federal Products Corporation, Providence, R.I.

[21] Appl. No.: 484,183

[22] Filed: Apr. 12, 1983

[51] Int. Cl.⁴ .................................. G01B 5/28
[52] U.S. Cl. .................. 73/105; 33/DIG. 1; 73/432 A; 403/DIG. 1
[58] Field of Search ............... 33/DIG. 1, DIG. 6; 73/105, 432 A; 404/DIG. 1

[56] References Cited

U.S. PATENT DOCUMENTS

| | | | |
|---|---|---|---|
| 2,207,248 | 7/1940 | Garlick, Jr. | 171/119 |
| 2,361,788 | 10/1944 | Neff | 73/104 |
| 2,404,143 | 7/1946 | Reason | 73/105 |
| 2,615,738 | 10/1952 | Johnson | 403/DIG. 1 |
| 2,631,272 | 3/1953 | Smith | 340/199 |
| 2,841,008 | 7/1958 | Brems | 73/105 |
| 3,070,742 | 12/1962 | Smith et al. | 323/60 |
| 3,537,719 | 11/1970 | Gottfried | 403/DIG. 1 |
| 3,723,928 | 3/1973 | Blakley | 33/DIG. 1 |
| 4,106,333 | 8/1978 | Saljé et al. | 73/105 |
| 4,290,303 | 9/1981 | Harman et al. | 73/105 |
| 4,341,019 | 7/1982 | Possati | 33/172 E |

FOREIGN PATENT DOCUMENTS

| | | | |
|---|---|---|---|
| 1189984 | 10/1959 | France | 5/4 |
| 433360 | 8/1935 | United Kingdom . | |

Primary Examiner—S. Clement Swisher
Attorney, Agent, or Firm—Morse, Altman & Dacey

[57] ABSTRACT

A surface finish, displacement and contour scanner is disclosed which effectively protects its stylus from damage even if the stylus meets an obstacle, such as a wall, a major ridge or a crack. The surface finish, displacement and contour scanner further includes a unique transducer designed to provide true displacement transducer operation with or without traverse, a magnetic attach-release mechanism disposed median between the stylus and a transducer, and a ball-and-notch seating structure formed about the point of flexing of the stylus support.

20 Claims, 5 Drawing Figures

SURFACE FINISH, DISPLACEMENT AND CONTOUR SCANNER

BACKGROUND OF THE INVENTION

1. Field of the Invention

The present invention relates generally to surface analysis systems and, more particularly, to a surface finish, displacement and contour scanner designed effectively to protect its stylus from damage even when encountering obstacles.

2. The Prior Art

Surface analysis systems that measure, compute, display and record linear profile and surface finish characteristics have been in use for some time. Such systems generally employ a stylus and an arm mounting the stylus cantilever style in an appropriate transducer. One such transducer is disclosed in U.S. Pat. No. 3,070,742 that was granted to G. Smith et al. on Dec. 25, 1962. These stylus and stylus arms are fragile and may be easily damaged. To protect the stylus and stylus arms, stylus protectors have been developed. The stylus protectors usually feature a skid designed to ride on the surface being analyzed adjacent the stylus. The position of the skid relative to the stylus must be carefully adjusted so as to allow adequate stylus motion and still provide protection against stylus damage. Skids, however, interfere with certain measurement operations and also limit, of necessity, the stylus displacement. Yet, despite the presence of such stylus protectors, and certainly in skidless operation, many a stylus is damaged, especially when the stylus comes upon an obstacle, such as a major ridge or crack. Further, stylus and stylus arms also are prone to damage if handled carelessly or improperly, whether prior to, during or after use. A need therefore exists for a simple, yet effective solution to protect the stylus and its arm from damage even if it meets such an obstacle or during careless or improper handling.

SUMMARY OF THE INVENTION

It is a principal object of the present invention to overcome the above disadvantages by providing a surface finish, displacement and contour scanner which effectively protects its stylus and stylus arm from damage even where the stylus meets an obstacle or during careless or improper handling.

More specifically, it is an object of the present invention to provide a surface finish, displacement and contour scanner for use in a surface analysis system designed to measure, compute, display and record linear profile and surface-finish characteristics, for displacement measuring without traverse, and for electronic gaging. The surface finish, displacement and contour scanner of the invention comprises a stylus for contacting a test surface, means for measuring the displacement of the stylus from a first (null) position, means for supporting the stylus with respect to the measuring means, and a magnetic attach-release mechanism incorporated in the supporting means and designed to allow for the separation of the stylus and a part of the stylus support from the supporting means whenever the force of the stylus from the first (null) position exceeds a predetermined value. The stylus may be a diamond stylus, a sapphire chisel stylus, a ruby ball or a carbide ball, or the like. Preferably, the measuring means is a linear variable displacement transducer, designed for true surface profile tracing with light stylus contact force, capable of producing readouts with or without traverse motion. Preferably, the supporting means comprises proximal and distal arms and a ball-and-notch seating structure releasably mating the distal arm to the proximal arm. The distal arm carries the stylus at its free end, and the proximal arm is mounted within the measuring means. Preferably, the ball-and-notch seating structure includes a plurality of balls secured to a bracket held by the distal arm, a member secured to the proximal arm and provided with a plurality of depressions, with the plurality of balls designed releasably to engage and sit within the plurality of depressions. The bracket of the ball-and-notch seating structure carries a plurality of magnets medial of the plurality of balls, and the member has a part formed of a high permeability material secured thereto medial of the plurality of depressions. The ball-and-notch seating structure is mounted in a barrel, which together with the measuring means are secured within a housing. A part disposed in the barrel and secured to the member acts as the fulcrum of the stylus supporting means. Preferably, the part, the member, the bracket and the proximal and distal arms are all formed of a non-magnetic material.

Other objects of the present invention will in part be obvious and will in part appear hereinafter.

The invention accordingly comprises the surface finish and contour scanner of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 5 is a perspective view of a part of the surface finish, displacement and contour scanner of FIG. 1.

DETAILED DESCRIPTION OF THE PREFERRED EMBODIMENT

Figure 1:
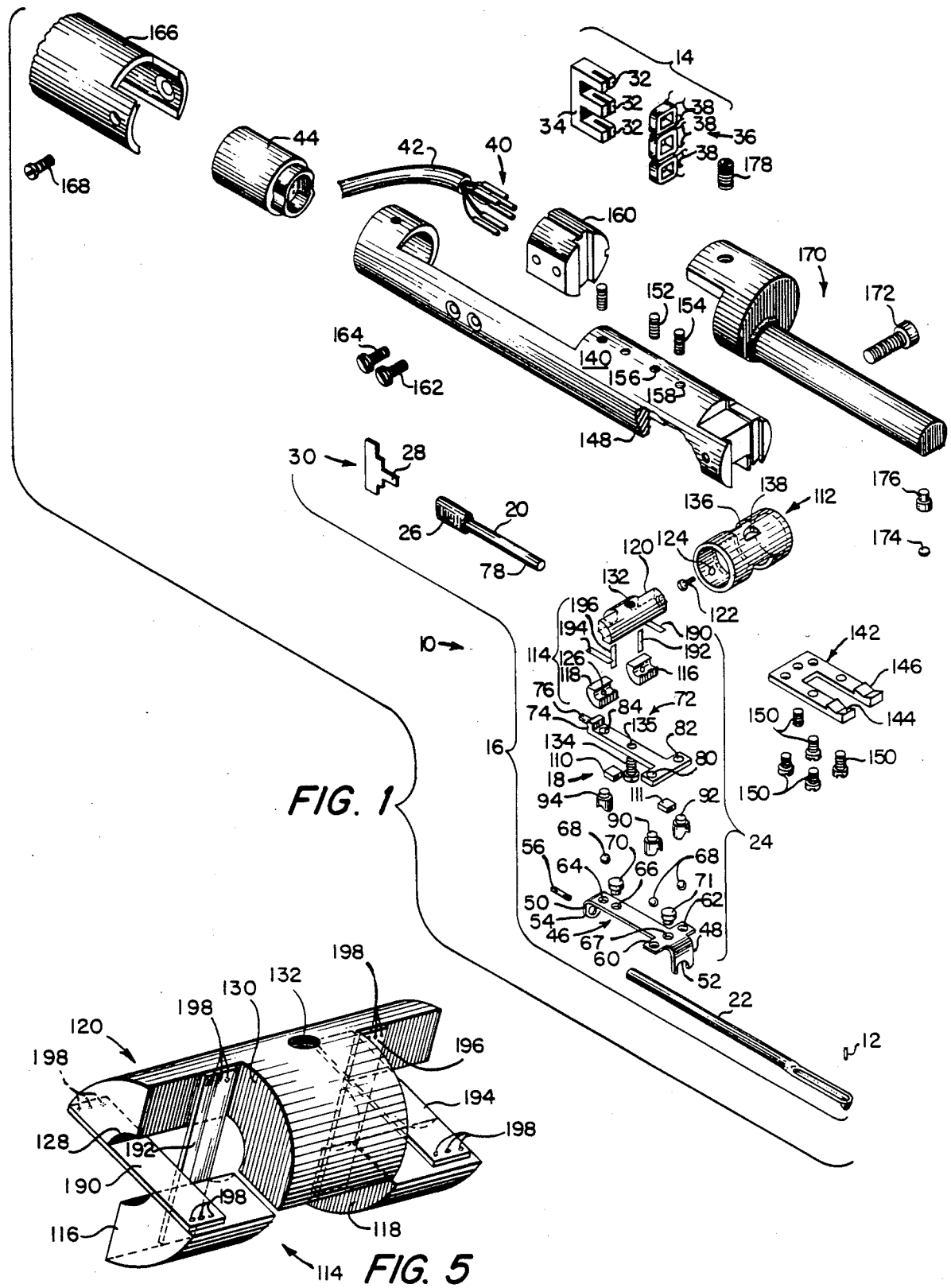
FIG. 1 is an exploded perspective view of a surface finish and contour scanner constructed in accordance with the present invention.

Generally, the illustrated embodiment of a surface finish and contour scanner 10, frequently referred to as a probe, shown in FIG. 1, is designed for use in a surface analysis system, not shown, which is used to measure, compute, display and record linear profile and surface finish characteristics, for displacement measuring without traverse, and to perform electronic gaging. By "traverse" as used in this specification and in the appended claims, it is meant to define a relative stylus motion which is parallel to the surface being measured. Such surface analysis systems are well known in the art and have been employed for a variety of laboratory and quality-control tasks. Their general applications, for example, include the surface measurement of the inside and the outside diameters of manufactured parts, of gear-teeth profiles, of grooves and of flats. Surface analysis systems readily detect such surface irregularities as bell mouth, runout, taper, roughness and waviness. Surface analysis systems also compute, display and record roughness averages (Ra) of measured surfaces. Roughness average (Ra) is an arithmetical average deviation, usually expressed in microinches or micrometers, and measured normal to the surface. Surface analysis systems are especially useful for measuring deposits on thick and thin-film microelectronic components, i.e., for electronic gauging.

The surface finish, displacement and contour scanner 10 (the probe) generally comprises a stylus 12, means 14 measuring the displacement of the stylus 12 from a "null" position, means 16 for supporting the stylus 12 in operative engagement with the measuring means 14, and a magnetic attach-release mechanism 18 incorporated in the supporting means 16 and designed to allow for the separation of the stylus from at least part of the supporting means 16 whenever the displacement of the stylus 12 from the "null" position exceeds a predetermined value. The stylus 12 may be any known stylus, such as a diamond stylus, a sapphire chisel stylus, a ruby ball or a carbide ball, or the like. Preferably, the measuring means 14 comprises a unique transducer, as more fully described below and designed to give true displacement transducer operation with light stylus contact force, producing readouts with or without traverse motion by the stylus 12.

The supporting means 16 preferably comprises a proximal arm 20 and a distal arm 22, and a ball-and-notch seating structure 24 releasably mating the distal arm 22 to the proximal arm 20. The stylus 12 is carried at the free end of the distal arm 22 and preferably is cemented in place by a suitable cement, such as an epoxy glue, a cyanacrylate glue (an anaerobic material), or the like. Preferably, the arms 20 and 22 are of tublar construction and formed of a non-magnetic material, such as aluminum. The proximal end 26 of the proximal arm 20 is flattened so as to be slipped over and mate with a projecting portion 28 of a thin, flat high permeability blade 30. Blade 30 in turn is designed to be accomodated within a plurality of slots 32 of an E-shaped ferrite core 34 or other suitable material. E-shaped core 34, together with a plurality of windings 36, comprise the measuring means 14, i.e., the unique transducer designed to provide true displacement transducer operation. The blade 30, accomodated as it is within each of the three colinear slots 32, functions as a movable "flux-carrier" whose slightest relative displacement within the slots 32 effectively changes the area of the air gap to control the relative magnitudes of flux produced in two magnetic circuits by an A.C. energized primary winding, in a manner similar to the operation of the transducer disclosed in U.S. Pat. No. 2,631,272, of G. Smith granted Mar. 10, 1953, the disclosure of which patent is incorporated herein by reference. The measuring means 14, therefore, is capable of producing readouts, measuring displacements, with or without traverse motion by the stylus 12. Wires 38 connected to the windings 36 at one end also are connected to electrical pins 40 at the other end. And the pins 40 are connected by a cable 42 to a plastic receptacle 44 designed to receive an electrical plug, not shown, by means of which the surface finish, displacement and contour scanner 10 of the invention is operatively connected to a surface analysis system of the type as above described.

Figure 3:
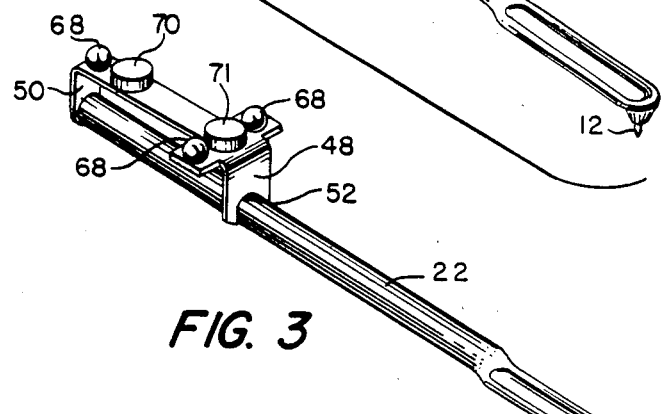
FIG. 3 is a perspective view of a portion of the parts shown in FIG. 2.

The ball-and-notch seating structure 24 includes a bracket 46 that is essentially t-shaped, preferably formed of aluminum, and is provided with a pair of legs 48 and 50. The front leg 48 is formed with a crescent 52 and the rear leg 50 is provided with a hole 54. A pin 56 is secured within the hole 54, projecting forward therefrom, and fits into the end of the distal arm 22, securing thereby the bracket 46 to the arm 22, with the crescent 52 overlying the arm 22, as may be best observed in FIG. 3. The bracket 46 furthermore is provided with five holes 60, 62, 64, 66 and 67. Holes 60, 62 and 64 are designed to receive a plurality of balls 68, preferably made of stainless steel, which are cemented in place in the holes 60, 62 and 64 by a suitable adhesive, such as epoxy or cyanacrylate, as shown in FIG. 3. Holes 66 and 67, which are formed medial of the holes 60, 62 and 64, in turn are designed to receive and be secured therein, magnets 70 and 71, which form one part of the magnetic attach-release mechanism 18.

The ball-and-notch structure 24 further includes a member 72 which also is T-shaped, preferably formed of aluminum, and is about the same size and shape as the bracket 46, but is provided with only a rear leg 74. Leg 74 also is provided with a hole to secure therein a pin 76, which is designed to fit into the distal end 78 of the proximal arm 20, securing thereby the arm 20 to the member 72. Member 72 also is provided with a plurality of holes 80, 82, 84 and 135. As may be observed, the locations of holes 80, 82 and 84 coincide with the location of the holes 60, 62, and 64 of the bracket 46. Secured within these holes 80, 82 and 84, as by being cemented therein, and projecting downwardly are a plurality of projections 90, 92 and 94, preferably formed of stainless steel. These projections 90, 92 and 94 are provided with a plurality of depressions 96, 98 and 100, the full significance of which will be more fully explained below. These plurality of depressions 96, 98 and 100 projecting thus from the member 72 are designed releasably to receive the plurality of balls 68 cemented in place on the bracket 46. Ferrite plates 110 and 111, forming the other part of the magnetic attach-release mechanism 18, are secured to the underside of the member 72, as for instance by being cemented thereto.

The member 72 is secured within a U-shaped barrel 112 via a structure 114. The structure 114 is designed to hold the member 72 within the barrel 112 with some flexibility. To achieve this flexibility, the structure 114 comprises a pair of stationarily mounted members 116 and 118 and a yieldably mounted member 120. Each of the members 116, 118 and 120 is arcuate and defines about a 90° segment for the former two and a 180° segment for the latter. The pair of members 116 and 118 are stationarily mounted laterally within the barrel 112 by screws 122 admitted through holes 124, respectively formed in the barrel 112 and the members 116 and 118. Member 120 is integrally formed of two 90° segments 128 and 130, all as may be best observed in FIG. 5. Segment 128 extends essentially the length of the barrel 112, whereas segment 130 is intended slidably to fit within the pair of laterally mounted members 116 and 118. As may be noted, the members 116 and 118 and the segment 130 together define the approximate length of the segment 128. Further, the yieldably mounted member 120 is provided with a tapped bore 132 to accomodate a bolt 134 by means of which the member 72 is secured thereto. To this end, the member 72 medially is provided with a hole 135. The member 120 is yieldably mounted to the pair of stationarily mounted members 116 and 118 by means of pairs of metal (preferably stainless steel) ribbons 190, 192 and 194, 196 respectively.

These pairs of ribbons 190, 192 and 194, 196 are each spot-welded at their respective ends, as at 198, alternately connecting the member 120 to the pair of stationarily mounted members 116 and 118. One ribbon 190 and 194 in each pair is mounted horizontally, while another ribbon 192 and 196 in each pair is mounted vertically, as may be noted in FIG. 5. The barrel 112 also is formed with a pair of half-moon cutouts 136 and 138, the significance of which will become apparent from below.

The barrel 112 in turn is held in place in the forward end of a housing 140 by a U-shaped plate 142 provided with a pair of grooves 144 and 146. The barrel 112 rests in the grooves 144 and 146. The plate 142 itself is secured to a flat-milled underside 148 of the housing 140 by a plurality of screws 150. A pair of screws 152 and 154, admitted into the housing 140 via a pair of tapped bores 156 and 158, are intended to bear against the pair of half-moon cutouts 136 and 138, securing thereby the barrel 112 against rotational displacement about its transverse axis, and also for setting the stylus force.

The measuring means 14, essentially comprised of the ferrite core 34 and the windings 36, is disposed in a member 160 which is secured about midway in the housing 140 by a pair of screws 162 and 164. Preferably, the housing 140 is enclosed by a cover 166, also formed of non-magnetic stainless steel, and secured to the housing 140 by screws 168.

The surface finish and contour scanner 10 may also be equipped with an optional stylus protector assembly 170. Assembly 170, if present, is adjustably secured to the front of the housing 140 by a locking screw 172. The stylus protector assembly 170 is provided with a skid 174 which is secured to the front of the assembly 170 by a member 176, both of which preferably are cemented within an appreprate receptacle formed in the assembly 170, all as is known. The optional stylus protector assembly 170 is used only in the skid mode of operation. For proper operation in the skid mode, it is necessary first to establish proper position or adjustment of the stylus protector assembly 170 to insure that it will allow adequate motion for the stylus 12 and still provide some measure of protection against stylus damage. To do this, the locking screw 172 is loosened and then a height adjustment screw 178 is turned clockwise until a stylus position display, not shown, on the surface analysis system of which the surface finish, displacement and contour assembly 10 forms a part, registers a "null" position. Once this null-position is adjusted, the locking screw 172 is re-tightened. If skidless operation is desired, either the stylus protector assembly 170 is removed or not mounted, or the locking screw 172 is loosened and the height adjustment screw 178 is turned clockwise at least one-half to one turn.

As mentioned, the surface finish, displacement and contour scanner 10 of the invention has been designed effectively to protect its stylus 12 and its supporting means 16 from damage even in instances when the stylus 12 comes upon a major obstacle, such as a wall, a high ridge or a deep crack, and that even when operating in the skidless mode. This is achieved by allowing the distal arm 22 carrying the stylus 12 from separating from the proximal arm 20 in each such instance. Following such separation, the distal arm 22 is once again simply re-united with the proximal arm 20 and the surface finish and contour scanner 10 of the invention is as good as new and ready for use. In like manner, one can easily exchange one type of stylus, say a diamond stylus, for another type of stylus, such as a sapphire stylus. After every such change, it is advisable however, first to check and adjust if necessary, the electrical "null" position of the stylus 12 before proceeding with the next measurement. The principles of separation of the distal arm 22 from the proximal arm 20 are best explained with reference to FIG. 4.

Figure 2:
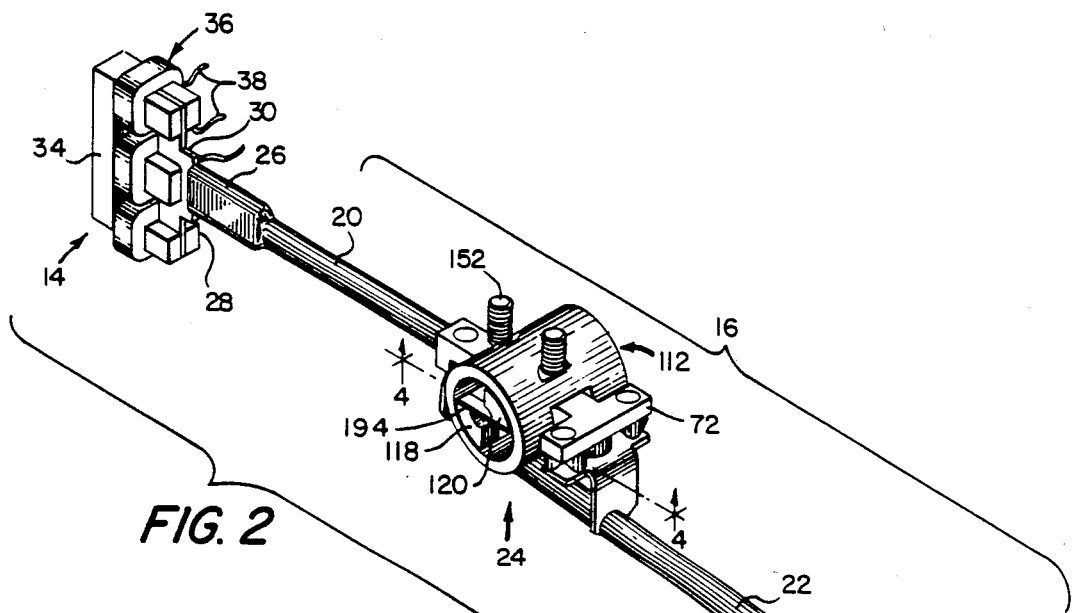
FIG. 2 is a perspective view of certain parts of the surface finish and contour scanner of FIG. 1 and showing those parts in assembled condition.
Figure 4:
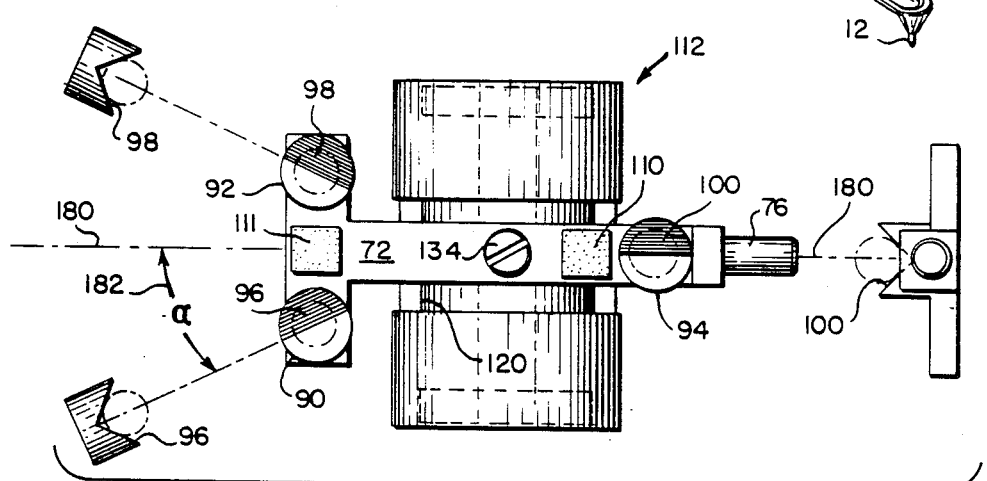
FIG. 4 is a bottom plan view of a portion of the parts shown in FIG. 2 and taken in the direction of the arrows along the line 4—4 thereof.

FIG. 4 is a bottom plan view of a portion of the ball-and-notch seating structure 24 and taken along the line 4—4 in the direction of the arrows in FIG. 2. As mentioned, it is this ball-and-notch seating structure 24 that is responsible for releasably mating the distal arm 22 to the proximal arm 20. The portion of the ball-and-notch seating structure 24 shown in FIG. 4 includes the t-shaped member 72 and the projections 90, 92 and 94 provided with the respective depressions 96, 98 and 100. As mentioned, these depressions 96, 98 and 100 are designed releasably to receive the plurality of balls 68 cemented in place on the bracket 46, forming the other portion of the ball-and-notch seating structure 24, which may be best observed in FIG. 3. The depressions 96, 98 and 100 are illustrated in FIG. 4 as being right angle depressions. It must be pointed out that the depressions 96, 98 and 100 need not be right angles but can comprise any obtuse angle. The blunter the angle the easier it is to dislodge the plurality of balls 68 from the depressions. In addition, the depressions 96, 98 and 100 need not all be V-shaped notches, as illustrated, but one of them, preferably the depression 100 can be cone-shaped, if desired. The provision of cone-shaped depressions in lieu of the illustrated V-shaped notches will render it more difficult to dislodge the plurality of balls 68 therefrom.

A further angle needs to be discussed that also has a direct bearing on the size of the breakaway force required to separate the distal arm 22 from the proximal arm 20 by dislodging the plurality of balls 68 form the depressions 96, 98 and 100 and, of course, in doing so, also overcoming the magnetic force exerted between the magnet 70 and the ferrite plate 110. This further angle has to do with the way the depressions 96, 98 and 100 are aligned with respect to the longitudinal axis 180 of the T-shaped member 72. Preferably, the depression 100 is coaxial with the longitudinal axis 100, as shown. Preferably, the depressions 96 and 98 are formed obliquely to the longitudinal axis 100, also as shown. It is pointed out that this oblique angle, in combination with the shape of the depressions 96, 98 and 100 and of the force exerted between the magnets 70 and 71, and the ferrite plates 110 and 111 combine to determine the overall breakaway force that is required to separate the distal arm 22 from the proximal arm 20 at the ball-and-notch seating structure 24. It is further pointed out that the greater is this oblique angle, the more force is required to achieve such separation. One preferred oblique angle ($\alpha$) 182 is shown to be about 25°. This angle ($\alpha$) 182 can vary anywhere from about zero to about right-angle.

Thus, in the event that the stylus 12 encounters an obstacle, such as a high ridge or deep crack, the breakaway force generated thereby will cause the separation, at the ball-and-notch seating structure 24, of the distal arm 22 from the proximal arm 20. The separated distal arm 22 is shown in FIG. 3. After such a separation, the separated distal arm 22 is readily snapped back in place, as shown in FIG. 2.

Thus it has been shown and described a surface finish, displacement and contour scanner 10 for use in a surface analysis system, which scanner 10 satisfies the objects and advantages set forth above.

Since certain changes may be made in the present disclosure without departing form the scope of the present invention, it is intended that all matter described in the foregoing specification or shown in the accompanying drawings, be interpreted in an illustrative and not in a limiting sense.

What is claimed is:

1. A surface finish, displacement and contour scanner comprising:
   (a) a stylus;
   (b) means for measuring the displacement of said stylus from a first position;
   (c) means for supporting said stylus within said measuring means; and
   (d) a magnetic attach-release mechanism incorporated in said supporting means and designed to allow for the separation of said stylus from said supporting means whenever said stylus meets a force which exceeds a predetermined value.

2. The surface finish, displacement and contour scanner of claim 1 wherein said stylus is one selected from the group consisting of diamond stylus, sapphire stylus, ruby ball and carbide ball.

3. The surface finish, displacement and contour scanner of claim 1 wherein said measuring means is a transducer comprising an E-shaped core provided with a plurality of slots and a blade designed to be accomodated within said plurality of slots, and said supporting means comprises proximal and distal arms and a ball-and-notch seating structure releasably mating said distal arm to said proximal arm.

4. The surface finish, displacement and contour scanner of claim 3 wherein said ball-and-notch seating structure includes a bracket secured to said distal arm, a plurality of balls secured to said bracket, a member secured to said proximal arm, and a plurality of depressions formed in said member, said plurality of balls designed releasably to engage said plurality of depressions.

5. The surface finish, displacement and contour scanner of claim 4 wherein one of said plurality of depressions is formed longitudinally along the axis of said member and the remaining of said plurality of depressions are formed obliquely to said longitudinal axis of said member.

6. The surface finish, displacement and contour scanner of claim 4 wherein said bracket carries at least one magnet medial of said plurality of balls and said member has a part formed of a high permeability material secured thereto medial of said plurality of depressions.

7. The surface finish, displacement and contour scanner of claim 4 further including a barrel and a structure flexibly securing said member within said barrel.

8. The surface finish, displacement and contour scanner of claim 7 wherein said structure acts as the fulcrum of said proximal and distal arms.

9. The surface finish, displacement and contour scanner of claim 8 wherein said structure includes a pair of stationarily mounted arcuate members and a yieldably mountd member flexibly secured to said pair of stationarily mounted arcuate members.

10. The surface finish, displacement and contour scanner of claim 9 further including a housing, said barrel secured within said housing, and a cable and plug assembly in electrical contact with said measuring means.

11. The surface finish, displacement and contour scanner of claim 10 further including a stylus protector assembly having a skid adjustably secured to said housing.

12. A surface finish, displacement and contour scanner comprising:
   (a) a housing provided with a receptacle for an electrical plug at one end thereof;
   (b) measuring means mounted within said housing in electrical contact with said receptacle;
   (c) a barrel mounted within said housing near the other end thereof;
   (d) supporting means including a proximal arm connected with its proximal end to said measuring means and a distal arm;
   (e) a stylus carried by the distal end of said distal arm; and
   (f) a ball-and-notch seating structure, including a magnetic attach-release mechanism, releasably securing said supporting means within said barrel.

13. The surface finish, displacement and contour scanner of claim 12 wherein said ball-and-notch seating structure comprises a bracket secured to the proximal end of said distal arm, a plurality of balls secured to said bracket, a magnet also secured to said bracket medial of said plurality of balls, a member connected to the distal end of said proximal arm and secured within said barrel, a plurality of depressions formed in said member, and a ferrite plate secured to said member medial of said plurality of depressions and facing said magnet.

14. The surface finish, displacement and contour scanner of claim 13 wherein at least one of said plurality of depressions is cone-shaped.

15. The surface finish, displacement and contour scanner of claim 13 wherein at least one of said plurality of depressions defines an obtuse angle.

16. The surface finish, displacement and contour scanner of claim 13 wherein two of said plurality of depressions are formed at an angle to the longitudinal axis of said member and, wherein said angle determines, for a given magnetic force exerted by said magnet, the force required to separate said distal arm from said proximal arm at said ball-and-notch seating structure.

17. In a surface analysis system of the kind for measuring, computing, displaying and recording displacements, linear profile and surface finish characteristics of parts, the improvement comprising:
   (a) a probe;
   (b) a stylus carried by said probe;
   (c) transducer means for measuring the displacement of said stylus form a null position;
   (d) means for supporting said stylus operatively coupled to said transducer means, said supporting means including proximal and distal arms releasably secured to one another by a ball-and-notch seating structure; and
   (e) a magnetic attach-release mechanism operatively associated with said ball-and-notch seating structure, said structure and said mechanism designed to allow for the separation of said distal arm from said proximal arm at said ball-and-notch seating structure.

18. The surface analysis system of claim 17 wherein said transducer means comprises an E-shaped core provided with a plurality of slots and a blade designed to be accomodated within said plurality of slots, and wherein all operative parts thereof, save for said transducer means and said magnetic attach-release mechanism, are formed of a non-magnetic material.

19. The surface analysis system of claim 17 wherein said stylus is one selected from the group consisting of diamond stylus, sapphire stylus, ruby ball and carbide ball.

20. The surface analysis system of claim 17 wherein said ball-and-notch seating structure comprises means secured to the proximal end of said distal arm including a plurality of balls and means secured to the distal end of said proximal arm including a plurality of depressions, said plurality of balls designed releasably to be accomodated within said plurality of depressions, and further including a barrel and a structure flexibly securing said distal arm within said barrel, said last mentioned structure acting as the fulcrum of said proximal and distal arms.

* * * * *